United States Patent [19]

Pitchford et al.

[11] Patent Number: 4,977,509
[45] Date of Patent: Dec. 11, 1990

[54] PERSONAL MULTI-PURPOSE NAVIGATIONAL APPARATUS AND METHOD FOR OPERATION THEREOF

[75] Inventors: Gary Pitchford, Phoenix; Steve Pitchford, Mesa, both of Ariz.; Paul Hyde, Pleasant Hills, Calif.

[73] Assignee: Campsport, Inc., Phoenix, Ariz.

[21] Appl. No.: 357,843

[22] Filed: May 30, 1989

Related U.S. Application Data

[63] Continuation-in-part of Ser. No. 281,734, Dec. 9, 1988, abandoned.

[51] Int. Cl.$^5$ ............................................. G06F 15/50
[52] U.S. Cl. ..................................... 364/449; 364/443; 364/457; 364/557; 364/558; 364/705.01
[58] Field of Search ............... 364/420, 443, 444, 448, 364/449, 453, 458, 460, 557, 558, 559, 569, 570-571.08, 709.01, 709.02, 709.11, 709.12, 710.02, 715.07, 721, 705.01, 710.07, 710.14; 235/61 NV; 73/178, 386, 384; 324/433, 244, 252; 250/338.1, 338.4, 342; 374/109, 121

[56] References Cited

U.S. PATENT DOCUMENTS

| | | | |
|---|---|---|---|
| 3,924,111 | 12/1975 | Farris | 364/443 |
| 4,172,285 | 10/1979 | Yoshida et al. | 364/443 |
| 4,317,106 | 2/1982 | Hüber | 364/444 |
| 4,445,090 | 4/1984 | Melocik et al. | 324/433 |
| 4,636,093 | 1/1987 | Nagasaka et al. | 364/557 |
| 4,642,776 | 2/1987 | Matsumoto et al. | 364/449 |
| 4,694,694 | 9/1987 | Vlakancie et al. | 73/386 |
| 4,797,840 | 1/1989 | Fraden | 364/557 |
| 4,831,538 | 5/1989 | Cucchiari | 364/443 |
| 4,857,840 | 8/1989 | Lanchais | 364/460 |
| 4,874,253 | 10/1989 | Pompei et al. | 374/121 |
| 4,878,170 | 10/1989 | Zeevi | 364/444 |

FOREIGN PATENT DOCUMENTS

| | | | |
|---|---|---|---|
| 2711343 | 9/1978 | Fed. Rep. of Germany | 73/384 |
| 2382728 | 11/1978 | France | 364/443 |

Primary Examiner—Parshotam S. Lall
Assistant Examiner—Michael Zanelli
Attorney, Agent, or Firm—Armstrong, Nikaido, Marmelstein, Kubovcik & Murray

[57] ABSTRACT

A personal multi-purpose navigational instrument which can be hand held and portable for transporting at long distances is disclosed. The navigational instrument can receive, process, display, store and interface data for navigational use, such as, bearing information, inclination and declination,temperature, barometric pressure, current and elapse times, or the like. The navigational instrument has an internal flux gate magnetometer, solid state temperature sensor, solid state barometric pressure sensor, infrared sensor, and real time clock. The navigational instrument has a foldable LCD display for outputting the desired navigational information and a keyboard for instructing or inputting information through an internal microprocessor. Numerous functions can be performed as desired by way of the operations performed by the user on the keyboard; i.e., by way of specifically operating the multiple keys or buttons on the keyboard in various specific steps in order to achieve, for display or the like, the desired navigational information. A protractor/graduated scale and a pop-up lens extend from the navigational instrument for use in orienteering, mapping or course plotting. An infrared sensor is provided for use at dark environments for detecting the presence of "hot" bodies. An optical input/output port for serially interfacing between the internal CPU of the instrument and another electronic device, computer or the like, is also provided. The internal components are effectively arranged between upper and lower casings to provide a very compact and portable navigational instrument which can withstand the worst or weather conditions.

37 Claims, 7 Drawing Sheets

FIG. 9a

REAL TIME CLOCK INTERRUPT HANDLER

UPDATE CLOCK COUNTERS

INCREMENT SLAVE COUNTERS
FOR ALL OTHER PROCESSES

RETURN

FIG. 9b

KEYBOARD INTERRURT HANDLER

READ KEY VALUE IN

SET RESPECTIVE KEY BIT
FOR TASK MANAGER

RETURN

DISPLAY MANAGER

120 — CHECK FOR DISPLAY TIME EXCEEDED — — NO → LOOP
　　　　　　　　　　YES
122 — LOAD DISPLAY BUFFER POINTER
124 — INCREMENT DISPLAY BUFFER POINTER
126 — SAVE NEW DISPLAY BUFFER POINTER
128 — LOAD DISPLAY BUFFER TO DISPLAY
　　　130　RETURN ← — — — — — — — —

FIG. 10

PERSONAL MULTI-PURPOSE NAVIGATIONAL APPARATUS AND METHOD FOR OPERATION THEREOF

This application is a continuation-in-part of application Ser. No. 281,734 filed Dec. 9, 1988 now abandoned.

BACKGROUND OF THE INVENTION

This invention generally relates to a personal multi-purpose navigational apparatus for use generally in numerous activities. More particularly, the invention relates to a personal multi-purpose navigational device having the capabilities of providing numerous navigational information, including direction, orientation, barometric pressure, temperature, current and elapse times, angles, distances, estimated time of arrival, altitude, inclination, declination, general weather conditions, location of "hot" bodies, or the like.

Often, a compact and portable device is essential in providing required or important information for use in industry, military, or the like. In most instances, a navigational instrument capable of providing a plurality of information is essential in order to avoid experiencing any problems in these activities and, in most instances, a navigational instrument is essential in obtaining the activities' goals. Moreover, the use of a compact and portable navigational instrument capable of providing a multitude of essential information enhances the user's involvement in these activities.

Accordingly, there is a need for a personal multi-purpose navigational apparatus or instrument which is portable, compact, lightweight, durable and capable of providing a multitude of navigational information and other information on the user's environment. Such a personal multi-purpose navigational instrument should have sufficient rigidity and durability capable of being used in the worst environmental conditions of different types of activities, such as, sailing, orienteering, backpacking, fishing, forestry, surveying, geology, infantry, survival and rescue activities, or the like. Moreover, the personal multi-purpose navigational instrument should be made of lightweight materials so as to be easily carried at long distances and at rugged terrain. The personal multi-purpose navigational instrument should further be well suited for communicating with external electronic instruments in order to more fully serve the user.

SUMMARY OF THE INVENTION

It is an object of this invention to provide a personal multi-purpose navigational apparatus and method of operation thereof.

It is another object of this invention to provide a personal multi-purpose navigational instrument which can be instructed to output temperature and barometric pressure.

It is another object of this invention to provide a personal multi-purpose navigational instrument capable of being operated by battery and utilizing special low power consumption circuitry for extending the operational life and providing long term data storage in the instrument's memory.

It is another object of this invention to accomplish the above by a personal multi-purpose navigational instrument having a multi-function keyboard for allowing a user to interact or communicate with the navigational instrument by, for example, selecting a number of special operations to provide numerous navigational information desired by the user.

It is a further object of this invention to provide a personal multi-purpose navigational instrument having an input/output port for allowing an external electronic device, an externally located computer, or the like to communicate with the navigational instrument.

It is a further object of the this invention to provide a multi-purpose navigational instrument preferably having an automatic or user-definable liquid crystal display contrast function which is dependent on measured surrounding or internal temperature.

It is a further object of the this invention to provide a multi-purpose navigational instrument having a lighting mechanism for night use which may be set to automatically engage when the user activates the navigational instrument for specific period of time during the day or a lighting mechanism which can be manually engaged.

It is a further object of this invention to provide an infrared thermal scan suitable for locating thermal or "hot" bodies within surrounding areas.

It is yet another object of this invention to provide a combination of all the above features within a compact, portable and sturdy personal multi-purpose navigational apparatus.

In accordance with one embodiment of this invention, a personal multi-purpose navigational instrument for use in a multitude of activities is disclosed. In this embodiment, a multipurpose keyboard which communicates with an internal microprocessor allows the user to communicate with the instrument for providing any desired navigational information. The instrument includes the immediate display of navigational information in digital form and digital bearing read-out from a flux gate sensor within the instrument. Determination of a corresponding course heading and the storage of the corresponding bearing, can be performed in the navigational instrument of the instant invention. The navigational instrument is provided with top and bottom casings for mounting thereon an LCD display for reading therefrom the navigational information. The navigational instrument preferably has an automatic or user-definable liquid crystal display contrast function which is dependent on measured surrounding or internal temperature. Furthermore, the navigational instrument has a lighting mechanism for night use which may be set to automatically engage when the user activates the navigational instrument for specific period of time during the day or a lighting mechanism which can be manually engaged. Moreover, a keyboard is operably mounted onto the top casing in order for the user to conveniently communicate with the microprocessor therein. Numerous functions can be performed as desired by way of the operations performed by the user on the keyboard; i.e., by way of specifically operating the multiple keys or buttons on the keyboard in various specific steps in order to achieve, for display or the like, the desired navigational information. A freeze switch is operably mounted within the casings for allowing any information outputted on the LCD display to be held for convenient and easy reading by the user. A pop-up lens is incorporated within the front portion of the instrument for allowing the user to simultaneously observe a target sight and navigational information displayed on the LCD display. A scaled protractor having fold-down capabilities is further operationally integrated within the body of the instrument for providing essential information with a map during navigation. An input/output port portion is further provided on a side portion of the instrument for allowing another microprocessor or an external electronic instrument to be operably connected to the internal microprocessor for allowing the internal microprocessor to communicate with the external microprocessor or the external electronic instrument. A flux gate, barometric sensor, temperature sensor and infrared sensor are all incorporated within the instrument and operably integrated within the internal microprocessor.

The foregoing and other objects, features and advantages of this invention will be apparent from the following, more particular, description of the preferred embodiments of this invention, as illustrated in the accompanying drawings.

BRIEF DESCRIPTION OF THE DRAWINGS

FIG. 9A is a flow chart more particularly showing the manner in which the real time clock interrupt handler is operated, while FIG. 9B is a flow chart more particularly showing the manner in which the keyboard interrupt handler is operated;

FIG. 10 is a flow chart which more specifically illustrates the manner in which the display manager, shown in FIG. 8, is operated.

DESCRIPTION OF THE PREFERRED EMBODIMENTS

Figure 1:
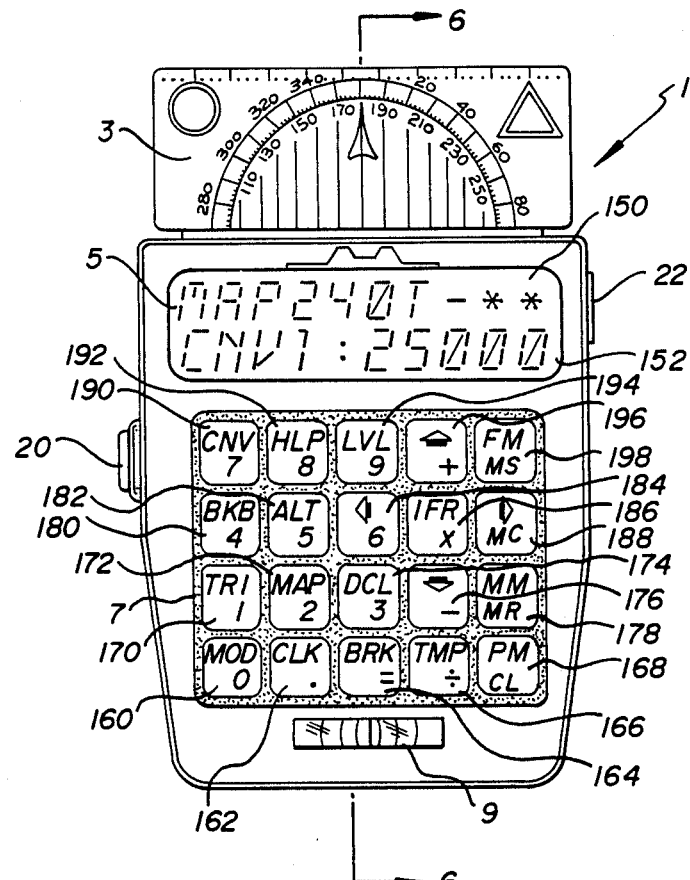
FIG. 1 is a top view of the fully assembled personal multi-purpose navigational instrument in accordance with the present invention showing the protractor scale, LCD display, keyboard and pop-up lens.

FIG. 1 shows the top elevational view of the personal multi-purpose navigational instrument (hereinafter, "navigational instrument"), generally designated by reference No. 1, showing a protractor scale 3, an LCD display 5, a keyboard 7, and a pop-up lens 9. The protractor and graduated scale 3 is one which can preferably be folded up or down (see, e.g., FIG. 3) and is preferably made of clear plastic material or the like. The protractor and graduated scale 3 is also preferably in the form of clear plastic plate etched with a protractor and graduated scale 3 for map use, or the like. The LCD display 5 is also preferably one which can be folded up or down (see, FIGS. 3 and 6). The LCD display 5 is used for displaying information desired by a user (such as, barometric pressure, temperature, bearings, inclination/declination, current time, elapse time, or the like). The keyboard 7 allows a user to input or output any of the above-described information in a manner which will later be more fully discussed. The pop-up lens 9 is more fully shown in FIGS. 2–4.

Figure 2:
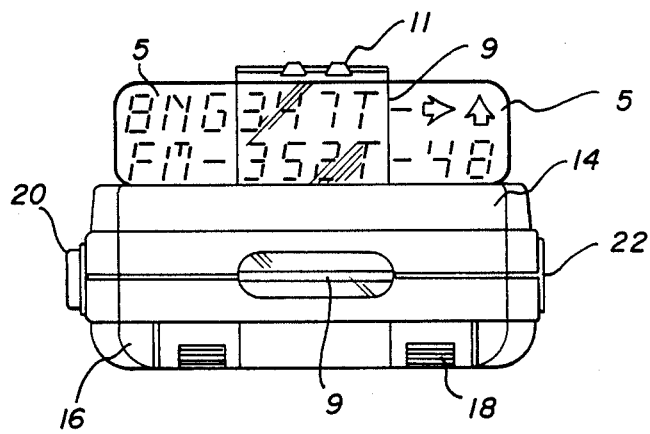
FIG. 2 is an elevational view showing a rear end portion of the personal multi-purpose navigational instrument of the instant invention showing the LCD display in its upstanding position.

In FIG. 2, it can be seen that the pop-up lens 9 in its upstanding position allows a user to sight an object and simultaneously read the bearing information from the LCD display 5, either at daytime or at night time. In line with the pop-up lens 9, is a forward sight portion 11 preferably integral to the top portion of the LCD display 5.

As can be seen in FIG. 2, the navigational instrument 1 is enclosed by upper 14 and lower 16 casings. Located at the bottom rear end portion of the lower casings 16 are battery doors 18. It is preferable that the upper 14 and lower 16 casings are made of sturdy and long-lasting materials and are fitted together so as to allow the navigational instrument 1 to be used in the most hostile environment (e.g., constant vibrations due to rugged terrain, water resistant due to weather conditions, extreme hot and cold weather conditions, or the like). On one side of the navigational instrument 1 is a freeze switch 20 which permits a user to hold or freeze any information displayed on the LCD display 5; thereby allowing the information to be conveniently and readily read by the user. Also at one side of the navigational instrument 1, is an input/output port 22 for allowing another instrument (such as, an external electronic instrument, microprocessor, or the like) to communicate with an internal microprocessor, later to be discussed, of the navigational instrument 1, or vice versa.

Figure 3:
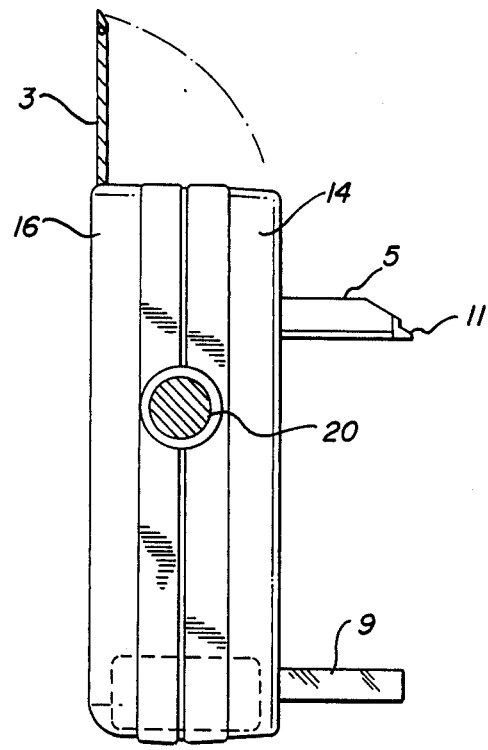
FIG. 3 is a left side elevational view of the personal multi-purpose navigational instrument of the instant invention showing the freeze switch, extending side portion of the protracted scale, upstanding side portion of the LCD display, and the upstanding position of the pop-up lens.

Shown in FIG. 3 are the structural and operational relationships of the extended or upstanding protractor and graduated scale 3, LCD display 5, and pop-up lens 9.

Figure 4:
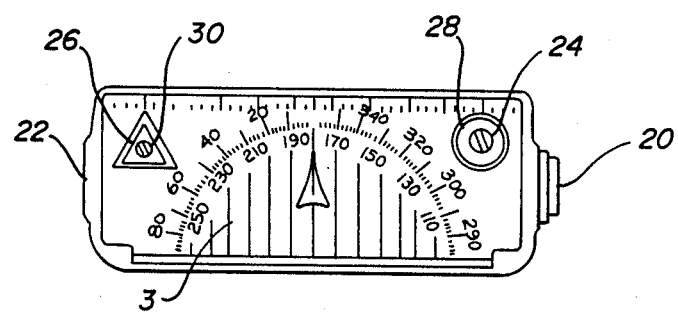
FIG. 4 is a front end elevational view of the navigational instrument showing a folded up protractor and graduated scale.

FIG. 4 illustrates the front end view of the navigational instrument 1 when the protractor and graduated scale 3 is folded up for abutting the front end side portion of the navigational instrument 1. The protractor and graduated scale 3 preferably has apertures 24, 26 passing therethrough. The apertures 24, 26 are provided for allowing a temperature sensor 28 and an infrared sensor 30 to outwardly extend from the front end side of the navigational instrument 1.

Figure 5:
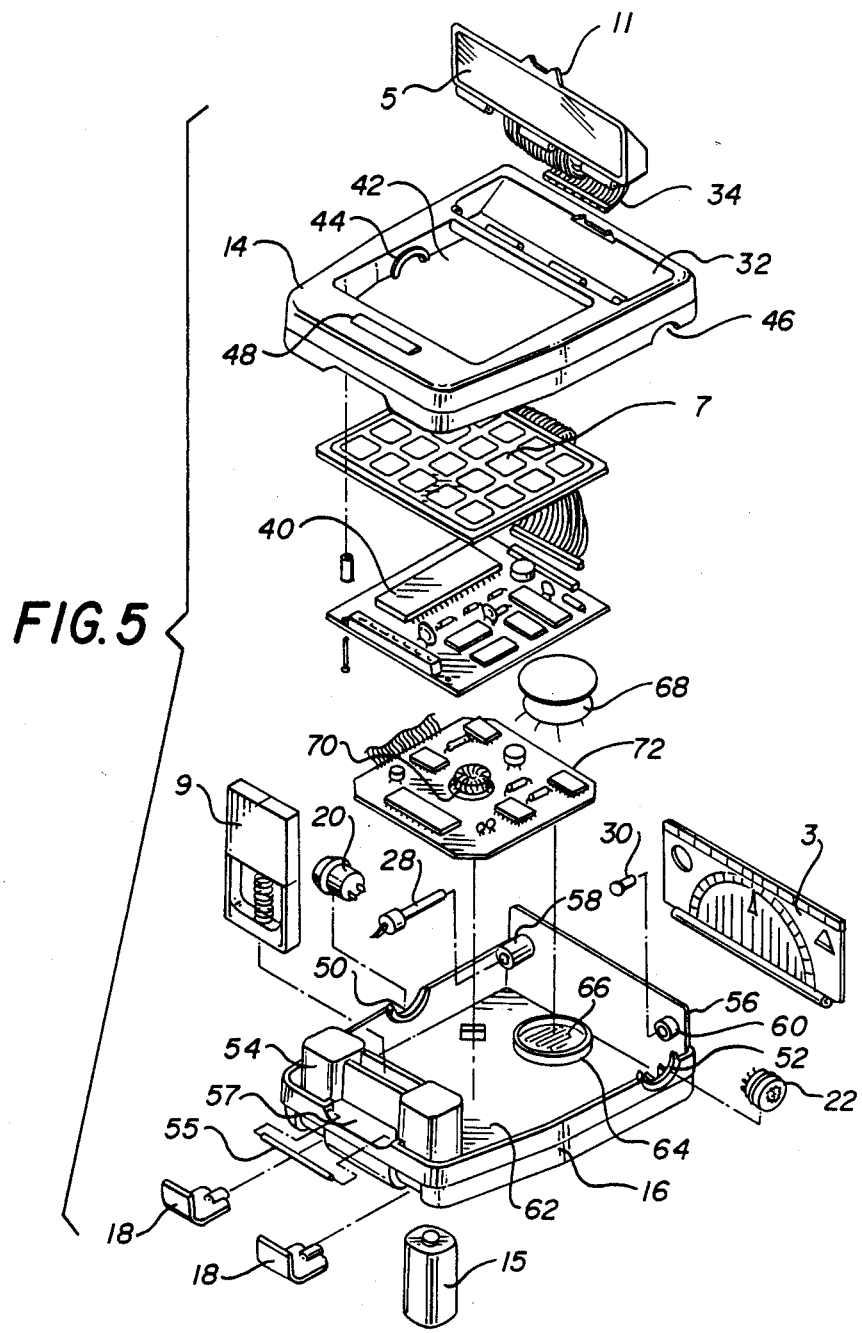
FIG. 5 is a perspective exploded view of the personal multi-purpose navigational instrument of the instant invention.

The exploded view illustrated in FIG. 5 more fully shows the manner in which the above-discussed parts are arranged, along with other parts yet to be discussed, within the upper 14 and lower 16 casings of the navigational instrument 1. As shown in FIG. 5, the LCD display 5 is preferably hinged to the upper casing 14 for allowing it to take on upstanding position or a position which allows it to be accommodated within the elongated indented portion 32 of the upper casing 14. The LCD display 5 has connecting wires 34 for connecting to an internal microprocessor 40. The upper casing 14 has an enlarged opening 42 passing therethrough for accommodating the keyboard 7 therein. The upper casing further has substantially semicircular shaped openings 44, 46 for accommodating therein portions of the freeze switch 20 and the inlet/outlet port 22, respectively. A substantially rectangular opening 48 also passes through the front portion of the upper casing 14 for accommodating therein the pop-up lens 9 during its upstanding position.

As further shown in FIG. 5, the lower casing 16 also has substantially semicircular shaped openings 50, 52 for accommodating therein portions of the freeze switch 20 and the input/output port 22, respectively. The lower casing 16 further has an upstanding channel 54 for accommodating therein the pop-up lens 9. The lower casing 16 further has a back side portion having mounted thereon guide members (such as, guide tubes, or the like) 58, 60 for mounting thereon the temperature sensor 28 and the infrared sensor 30, respectively. The infrared sensor 30 is operably connected to a generator (not shown) which is operably connected to a microprocessor 40 for driving the infrared sensor 30 by way of the microprocessor 40. At the internal base portion 62 of the lower casing 16 is a dish-like member 64 having a perforated bottom portion 66 passing through the base side 62 of the lower casing for accommodating thereon a barometric pressure sensor 68. The barometric pressure sensor 68 is preferably one which is of a solid state type.

A lanyard rod 55 is lodged within a groove portion 57 of the lower casing 16 for allowing a strap (not shown) to be coupled for use when carrying the instrument 1.

Immediately beneath the keyboard 7 is a microprocessor 40 having a read only memory (ROM) portion for housing the microprocessor software and a random access memory (RAM) for storing data and programs. The microprocessor 40 is preferably an "INTEL" 8031 type, or the like. Immediately below the microprocessor 40 is a flux gate magnetometer 70 in a circuit board 72 having an X and Y output being on an orthogonal relationship with each other. The flux gate magnetometer 70 provides azimuth information, along with other navigational information, which are then translated and stored for outputting to the LCD display 5 from a user's instructions through the keyboard 7. The flux gate magnetometer 70 is preferably that of a solid state device.

Figure 6:
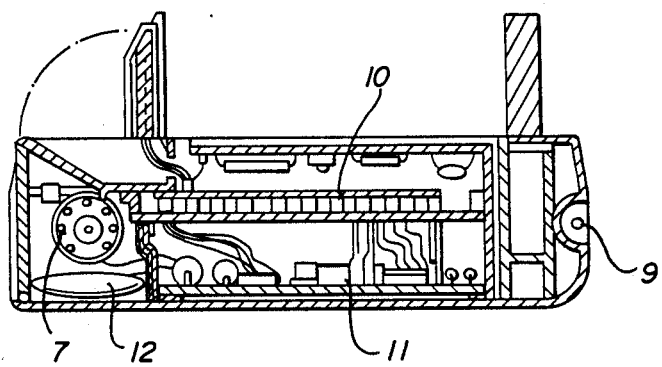
FIG. 6 is a cross-sectional view taken along line 6—6 of FIG. 1 showing the manner in which the internal components of the personal multi-purpose navigational instrument of the instant invention is effectively and compactly arranged within the upper and lower casings.
Figure 7:
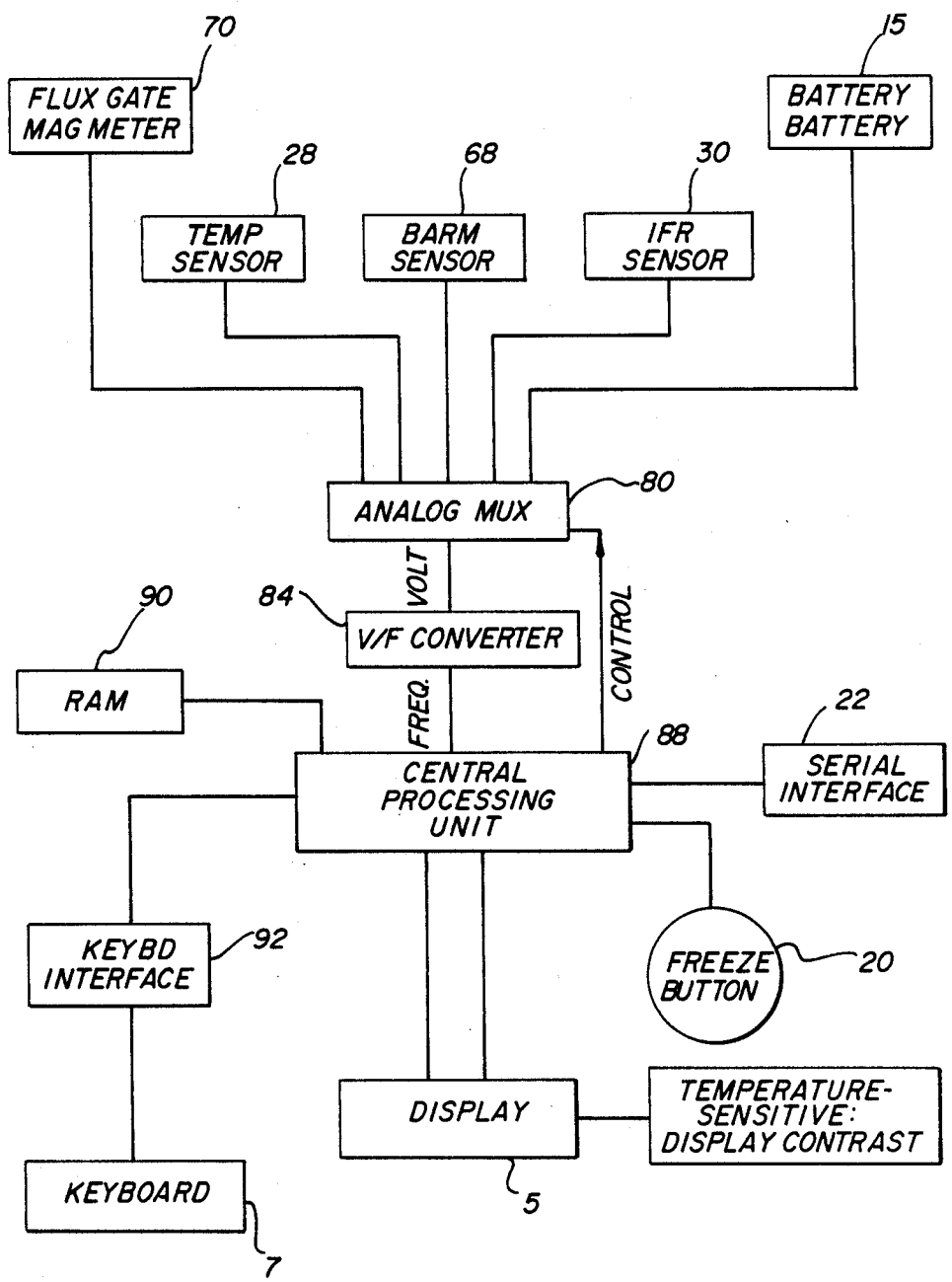
FIG. 7 is a block diagram showing the manner in which the different structures of the personal multi-purpose navigational instrument of the instant invention are operably connected to each other.

The manner in which the above-described components are connected to each other is illustrated in FIG. 7 and are shown in FIG. 6 to be arranged in a very compact manner inside the upper 14 and lower 16 casings. As illustrated in FIG. 7, the battery 15, for power supply encased within the battery door 18 is connected to an analog multiplexer 80. Moreover, the temperature sensor 28, infrared sensor 30, barometric sensor 68, and the flux gate magnetometer 70 are all operably coupled to the analog multiplexer 80. The analog multiplexer 80 is directly connected to a serial analog-to-digital converter 84 which is, in turn, operably connected to the central processing (CPU) 88 of the microprocessor 40. The CPU 88 preferably has a random access memory (RAM) 90. Also, the CPU 88 preferably has a read only memory (ROM), timers, serial unit, and master oscillator (not shown). The input/output port 22 for serial interfacing with other electronic equipment, computers, or the like, is also directly connected to the CPU 88. The keyboard 7 is operably joined to a keyboard interface 92 for directly coupling to the CPU 88. The display 5 is also directly operably joined to the CPU 88. The freeze button 20 is also operably connected to the CPU 88 for momentarily halting or freezing the display of information on the LCD display 5; thereby, allowing the displayed information to be conveniently and readily read by the user.

The operation of the navigational instrument 1 is hereinafter described. Initially, the instrument 1, by way of a software, queries the user for the correct time and date, and from there, the microprocessor 40 proceeds to maintain the current time through the use of software and internal counter timers within the CPU. The analog-to-digital converter is used by the software for constantly monitoring bearing signals, temperature signals, pressure signals and power status signals. The data from the various signals can then be used to calculate various functions for display until the user requests more specific calculations through the use of the keyboard 7. Examples of specific functions performed by the microprocessor 40 include the current barometric pressure corrected for temperature for providing the density altitude, or the use of the keyboard 7 as a calculator. Moreover, the user may specify certain data for retention in the RAM 90 until such time as when the data, when desired, is loaded into additional instruments or another computer through the use of the software which provides the communication capability through the input/output port 22 of the serial interface of the CPU 88.

Figure 8:
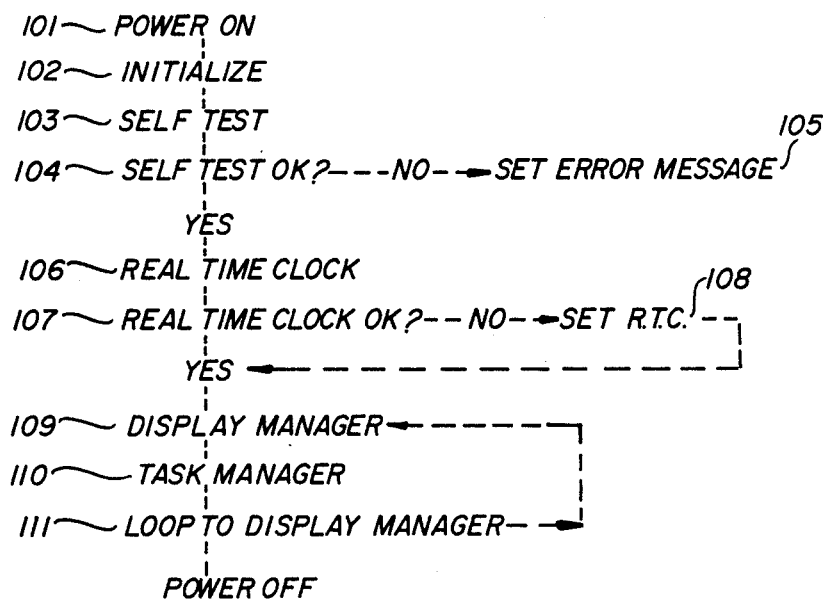
FIG. 8 is a flow chart showing the manner in which the personal multi-purpose navigational instrument is operated.

As illustrated in FIG. 8, when the power is turned on (step 101), the CPU 88 proceeds to execute the initialization (step 102) portion of the software. The CPU 88 then self-tests (step 103) its internal mechanisms. Examples of the tests performed by the CPU 88 under the self-tests mode 103 include a test of the memory, battery voltage and real time clock data validity. If all the tests results in the tested functions are correct, the CPU 88 continues through the main software execution. At this point, the sensors 28, 68 are read by the CPU 88 for establishing initial values and are then loaded into separate buffers in the microprocessor memory. The display manager (step 109), see also FIG. 10, begins to execute and the display data is fed from the internal buffers. The display manager in step 109 operates through a series of different types of data (i.e., temperature, magnetic bearing, magnetic back bearing, true bearing, true back bearing, pressure altitude, time or the like) and the display data is continually updated every second. The actual display data, sequence, and rate are definable by the user.

As indicated in FIGS. 9A and 9B, interrupt driven processes occur as required. Examples of the interrupt modes include the operation of the real time clock, and keyboard processes which are driven by the timer interrupt steps (see FIG. 9A) and keyboard interrupt step (see FIG. 9B), respectively.

As the microprocessor 40 executes its primary software in an endless loop (steps 109-111), the microprocessor 40 awaits for a user to input via the keyboard 7 for any commands on additional or more specific functions. Examples of additional or more specific functions include, for example, with the use of the keyboard 7, navigational calculations, bearing sights, redefining the display activity, engaging the infrared sensor 30, enabling the optically coupled serial interface through the input/output port 22, or the like.

The display manager step (step 109) is more particularly defined in FIG. 10. Here, a check is made as to whether the internal display time is exceeded. Upon a negative response on whether the display time is exceeded, the task manager (step 110) is then executed. Upon a positive response on whether the display time is exceeded as in step 120, the display buffer pointer is loaded (step 122), and the display buffer pointer is incremented (step 124). The new display buffer pointer is then saved (step 126), and the load of the display buffer is then displayed (step 128); thereafter, the display manager is returned (step 130) whereby the task manager (step 110) is then executed.

In step 110, numerous discrete software modules are imbedded within the microprocessor 40 for execution of the task manager step (step 110) and for accomplishing specific tasks. In this manner, a high degree of flexibility in the management of software functionality is provided in the overall design. As software functions are enhanced, improved or added, they can be provided to the user through update disks which may be loaded on a standard personal computer and down loaded to the navigational instrument 1 by way of the input/output port 22 of the optically coupled serial interface connected to the CPU 88 without the necessity of returning the entire navigational instrument 1 to a factory or service center for updating.

Figure 11:
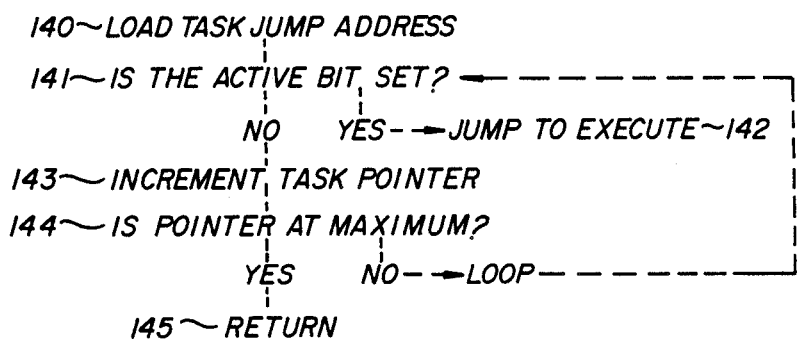
FIG. 11 is a flow chart more particularly showing the manner in which the task manager, shown in FIG. 8, is operated.

The task manager step (step 110) as shown in FIG. 8 can be further defined in the steps illustrated in FIG. 11. In step 140, a task jump address of the CPU 88 is loaded. In step 141, it is determined whether the active bit in the RAM 90 is set. Upon a positive response, the jump step (step 142) is executed. Upon a negative response in step 141, the task pointer is incremented (step 143). It is then determined whether the pointer is at a maximum, upon which a negative response reverts back the task manager step to step 141 in a loop pattern. Upon a positive response in step 144, a loop back to the display manager (step 109), as indicated in step 111, is executed.

As examples of various tasks from which the task manager 110 is executed for display include: key selected task, temperature update task, magnetic bearing update task, barometric pressure update task, low battery update task, or the like. In the key selected task, the key select bit string is tested for a "1" as set by the keyboard interrupt manager (see FIG. 9B), and used as a pointer to each task along with the respective keyboard function code. As to the temperature update task, the temperature sensor 28 is used as the analog-to-digital input. The analog-to-digital code or signal is called to obtain an updated temperature value which is stored in the respective buffer for the display manager. In the magnetic bearing update task, the flux gate magnetometer 70 is used as the analog-to-digital input and for calling the analog-to-digital code to obtain an updated magnetic bearing value which is then stored in the respective buffer for the display manager. In the barometric pressure update task, the barometric pressure sensor 68 is used for the analog-to-digital input and the analog-to-digital code or signal is called upon to obtain an updated value for the barometric pressure which is then stored in the respective buffer for the display manager. As to the low battery update task, the battery power is selected as the analog-to-digital input, and the analog-to-digital code or signal is called upon to obtain an updated value which is then compared against a "low" limit. If both values become substantially equal, an alarm flag is set for notifying the CPU 88.

The task manager calls upon special modules which provide the programs or processes as a result of external influences or inputs to the CPU 88. Examples of the keyboard modules include modules for calculation, bearing sights, display modifications, alarm setting, serial port communications, loading and displaying waypoints, calculating pressure altitude, calculating inclination, infrared sensor data utilization, or the like.

The LCD display 5 is preferably a two-line liquid crystal device. Since, in general, liquid crystal displays are temperature sensitive, it is necessary to adjust the contrast in response to temperature changes. The navigational instrument 1 preferably has an automatic or user definable liquid crystal display contrast function which is dependent on measured surrounding or internal temperature. Additionally, the LCD display 5 has a lighting mechanism for night use which may be set to automatically engage when the user activates the navigational instrument for specific period of time period of the day (e.g., 5 PM to 7 AM) or a lighting mechanism which can be manually engaged through the use of a DLB button later to be discussed.

When the navigational instrument is initially turned on, it is preferable that the active display functions of the LCD display 5 be defined prior to use. The defining of the display functions of the LCD display 5 can be accomplished by the user's interacting or manually communicating with the navigational instrument during the initialization mode discussed earlier. For example, the navigational instrument 1 enters a configuration mode and queries the user for initial values to be inputted. This process includes a list of user selectable functions to be displayed. Should the user opt to modify the initial parameters at a later time, he may do so by pressing the program (PM) button 168 which is later discussed. Thus, the user is provided with a menu of options at, for example, the initialization process. Once the data to be displayed is selected, the data is sequentially displayed on the upper line portion 150 of the LCD display 5, one function at a time, until all selected functions have been displayed. At this point, the display proceeds to repeat and will continue to do so until interrupted. The lower line portion 152 of the LCD display 5 is used for keyboard selectable special functions, such as during the pressing of the Field Memory (FM) button 198, Map Memory (MM) 178, altimeter function (ALT) 182 or the like, which are to be later discussed.

Since it is possible to have more data than can be displayed on the single lower line 152 of the LCD display 5, the arrow keys 176, 184, 188, 196 are provided to move or scroll through the data of interest to the user. If the navigational instrument is not used for a defined period during initialization, it will preferably switch to low power consumption standby which consequently disables the LCD display 5 until the user selects an activity or a function or presses the break button (BRK) 164.

When the navigational instrument is initially equipped with a battery 15, it will recognize this fact and executes a power-up phase. Firstly, the navigational instrument will operate through a self-test 103 and then queries the user for, for example, date, time, data to be displayed in normal mode, rate of display scrolling, keyboard-beep-enable, alarm settings, conversion factors, local variation and for a special code provided, for example, from a user's manual for initializing the navigational instrument to accommodate any tolerances in manufacture. After these parameters are provided, it will proceed to continuously display the defined active functions in the upper line 150 of the LCD display 5 until a button or key is struck indicating that the user wants to execute another function.

If the battery 15 is required to be replaced, the navigation instrument allows each battery 15 to be replaced individually. This allows the memory 90 to be left intact, although some functions will require resetting, such as time and date.

As previously discussed, navigation instrument 1 is equipped with the display 5 and keyboard 7 to allow the user to interact with and define its various functions. Through the use of the keyboard 7, the user can request specific functions to be displayed, store data, calculate values, do conversions or move data and programs to and from the instrument.

The keyboard 7 is preferably comprised of 20 buttons or keys (see, FIG. 1). Each button or key preferably has two functions. The top descriptor on each key is the primary function of that key. For example, the uppermost left button is marked CNV 190. This button is employed to invoke the conversion function. If the user presses the CNV button, the regular display in the LCD display 5 is discontinued, and the LCD display enters the conversion function. At this point, the user may execute a conversion or release the display from this task for a return to regular display or activity.

If a user desires to invoke a secondary function as defined by the lower descriptor on a button or key, the user may do this by changing the keyboard mode through the use of the MOD or mode key 160 which is located at the lowermost left portion of the keyboard 7. If the user so desires, the keyboard 7 may be provided with a "beep" function each time a button or key is pressed so as to provide an audible confirmation of a button depression.

The following description contains specific examples of the different operations and uses of the navigational instrument and each function button.

When taking bearings of distant objects, a user may hold the navigation instrument at a level which is preferably at waist height, while keeping it away from metal objects. Alternatively, the user may choose to use the sighting system of the navigational instrument. When the sighting system is used, the LCD display 5 is flipped up from the elongated indented portion 32 (see, FIGS. 3 and 5), and depressing and then releasing to thereby pop up the pop-up sighting lens 9 (see, FIG. 3). Looking through the lens 9, the user can now simultaneously view the object seen in the forward sighting notch or the forward sight portion 11 and the display 5. When the user has completed his desired activities, the navigational instrument may be restored to its normal configuration by reversing the actions described above.

As shown in the keyboard 7 in FIG. 1 (fourth row down, left most column), the MOD/"0" button 160 can be found. When used as a calculator (i.e., in mode 2), the buttons' use as a calculator is self evident (i.e., the lower character in each button or key is employed as in a conventional calculator). The MOD button 160 can be depressed so as to select whether the keyboard 7 should be operating in the mode 1 or mode 2 function. When used in mode 1 (i.e., employing the upper character in each button), the depression of the button allows the user to specifically select the keyboard mode. In other words, mode 1 is the function described in the upper section of each button, while mode 2 is the function described in the lower section of each key.

In the fourth row down, second column from the left of the keyboard 7 is the CLK/"." button 162. When used as a calculator (mode 2), the button's use as in a conventional calculator is self-explanatory. When used in mode 1, the CLK button 162, when depressed invokes the time manipulation functions; i.e., a functional stopwatch, and date/time set functions.

In the fourth row down, third column from the left of the keyboard 7 is the BRK/"=" button 164. When used as a conventional calculator, (mode 2) the button's use is self-explanatory. When operated in mode 1, the BRK button 164, when depressed, invokes an escape function which allows the user to back out of any activity the user may have entered into by error or wished to discontinue. If the BRK button 164 is used while in normal display mode, it will cause the LCD display 5 to stop scrolling through the active list of display functions, and to only show the specific function which was active at the time the BRK button 164 was pressed. Thus, if the user desires to see only the bearing in the active display 5, the user may do so by pressing the BRK button 164 while the bearing is displayed. When the user is ready to resume normal display functions in the display 5, the user may do so by pressing the BRK button 164 a second time.

In the fourth row down, fourth column from the left of the keyboard 7 is the TMP/"÷" button 166. When used in mode 2, the use of the key as in a conventional calculator is self-explanatory. When used in mode 1, the TMP button 166, when depressed, invokes the temperature function and causes temperature data to be displayed.

The temperature function, in conjunction with the temperature sensor 28, provides the user with current temperature information in either degrees F or degrees C. The TMP button 166 may be used in conjunction with other internal functions, including for example, the field memory and altitude functions as discussed below. The temperature function may be preferably invoked in, for example, the following two ways:

1. the user may "freeze" the active display with the BRK button 164 as the temperature function is being displayed. This will display the temperature on the upper line 150 of the LCD display 5; and 2. the user may press the TMP button 166, in which case, the temperature data is displayed on the lower line 152 of the display 5.

The user may exit the temperature function by pressing the BRK button 164.

In the fourth row down, fifth column from the left of the keyboard 7 is the PM/"cl" button 168. When used as in a conventional calculator (mode 2), the key clears the current entry in the display 5 to allow for corrections or reentry of values into the display 5. When used in mode 1, the PM button 168, when depressed, invokes the program function. This key allows the user to select from a number of special functions, such as, transferring data and programs between the navigation instrument and external devices, resetting initial device parameters, running diagnostics or the like.

The function accompanying the PM button 168 allows the user to invoke a number of specialized tasks and utilize functions through the use of a menu. To invoke this function, the user presses the PM button 168. The lower line 152 of the display 5 then proceeds to display a menu which the user may scroll through using any of the arrow buttons or keys 176, 188, 196, 198. Once a selection in the menu being displayed in the display 5 is selected by the user, the user again presses the PM button 168 to invoke the task corresponding to the selected portion of the menu. In order to exit from the program function, the user may press the BRK button 164.

Examples of the functions accompanying the PM button 168 include the following:

1. Initialization: this function allows the user to reengage the initialization function, and change any parameter the user desires;

2. Diagnostics: this function allows the user tests on each function of the navigational instrument support by way of stand-alone diagnostics;

3. Battery Test: this function will cause the battery voltage to be displayed in the lower line 152 of the display 5;

4. Optical Port Enable: this function allows the user to engage the optical communications port, and upload or download data and programs;

5. Enable Program: this program informs the navigational instrument to jump to and execute a special program that has been downloaded to the internal memory;

6. Review Offsets: since each device has manufacturing tolerances that impact on its accuracy, the navigational instrument of this invention is preferably equipped with a software-based error correction system. In other words, the navigational instrument is preferably provided with a special number at the initialization step (step 102, see FIG. 8) which describes the correction factors for each function it must perform. This specific function allows the values to be examined and modified. It is preferred that the specific review offset function should only be used by knowledgeable users.

7. Examine Memory: this function is a programmers tool which allows the user to step through all memory locations in the navigational instrument, and hex dump the data found therein. In order to exit the PM function, the user simply presses the BRK button 164.

In the third row down, leftmost column of the keyboard 7 is the TRI/"1" button 170. When used as a conventional calculator (mode 2), the key's use is self-explanatory. When used in mode the TRI button 170, when depressed, invokes the triangulation function.

In other words, in order to pinpoint a user's exact location, the user may prefer to use triangulation. Triangulation is a method of determining an unknown from two knowns. By using a map and the navigational instrument of this invention, the user determines the known parameters (i.e., distance and/or angle to landmarks). The user then presses the TRI button 170. The lower line 152 of the display 5 allows the user to scroll through a variety of trigonometric formulas using the arrow keys 176, 188, 196, 198. For example, a formula, such as "a squared value equals b squared plus c squared minus two times b times c times the cosine of a". With this formula, the user may determine either a desired angle or distance. When the user has identified the desired value, the user then presses the TRI button 170, and the previously acquired known parameters or values are automatically entered in the selected formula. The desired answer is then calculated and displayed on the lower display line 152 of the display 5. In order to exit the triangulation function associated with the TRI button 170, the user simply presses the BRK button 164.

In the third row down, second column from the left is the MAP/"2" button 172. When used as in a convention calculator (mode 2), the key's operation is self-explanatory. When used in mode 1, the MAP button 172, when depressed, invokes the map offset function.

The map offset function allows the user to set an arbitrary point of reference, and then read out the positive (to the right) or negative (to the left) angle in degrees relative to another point.

The MAP button 172 provides a unique offset function which is used in conjunction with the fold down protractor scale 3 to plot a course on a map such as one would with any orienteering type compass. The map, for example, may be facing any direction of a route layout. However, once the user begins to plot with the navigational instrument of this invention, the direction of the map cannot be changed or else, the readings will be in error. Here, the user flips down the protractor scale 3, as shown in FIG. 1. By using the protractor's north arrow, the user should align the navigational instrument with the "north" as shown on the map. The user should then press the MAP button 172. Then user then observes the bearing in the lower line 152 on the display 5 set to north. Here, the reading is a "false"north as it is set to be in conformity with the map. From this point, the user may use the navigational instrument in conjunction with the map to establish the bearings required for each leg of the user's planned journey. Since the map information is often described in "true" north, it is important at this time to have the proper declination programmed into the navigational instrument as indicated on the map. Simple angles can, for example, be defined in the field through the use of the MAP button 152. For example, by pointing the navigational instrument at one target and striking the MAP button 152, the user will establish a false "north" or zero point. The user should then rotate the navigational instrument clockwise until the navigational instrument is pointing at the second target. At this point, the user may then read the simple angle difference between the two points in terms of degrees. Additionally, by pressing the DLB button (later discussed), the user may "freeze" the display 5 for further review or manipulation of the data thereon.

In the third row down, third column from the left is the DCL/"3" button 174. When used as in a calculator (mode 2), the key's use is self-explanatory. When used in mode 1, the DCL button 174 allows for observation and modification of the declination (sometimes referred to as "variation") values stored in the navigational instrument.

The declination or variation is the difference between magnetic north and true north. Typically, topographical maps have the declination printed on the bottom, usually with the legend. The navigational instrument of this invention allows the user to define the declination according to latitude by way of the DCL button 174. Once defined, the navigational instrument will automatically calculate and display the true north for the user.

In order to have the navigational instrument provide the correct declination value, the DCL button 174 is pressed. The user then sees the current value of declination displayed on the lower line 152 on the display 5. In order to change the value being displayed, the user simply enters the new numeric value, and the plus or minus sign required to indicate if the declination is to be added (west) or subtracted (east) from the magnet bearing. Once the declination function has been invoked, the active true bearing display will contain the letter "T" to indicate that the bearing is in fact the true north. If the declination function has not been invoked, the active true bearing display will be followed by the letter "M" to indicate that it is still only the magnetic bearing.

In the third row down, fourth column from the left of the keyboard 7 is the symbolized down-arrow/ "—" button 176. When used as in a conventional calculator (mode 2), the key's use is self-explanatory. When used in mode 1, the down-arrow button 176 allows a user to scroll "down" through various functions, such as, map memory and waypoint (i.e., a point in time when all available data was recorded) data on the display 5.

In the third row down, fifth column from the left of the keyboard is the MM/ "MR" button 178. When used as in a calculator (mode 2), the key is used as a normal memory recall key as in any calculator, and not as a means for recalling waypoint or field memory data. When used in mode 1, the MM button 178, when depressed, allows for input and review of the memory locations dedicated to storing map information generated as part of a user's pre-journey planning phase.

The MM button 178 allows the user to store information on a user's impending journey for later access, as required by the user, in the field. In other words, the stored information would then be the repository of all predetermined bearing, distance, altitude, time and vertical angle (slope) information during the user's journey.

In order to use the map memory function associated with the MM button 178, the MM button 178 is depressed. At this point, the lower line 152 of the display 5 queries the user for a storage memory location. The user may now enter the storage location which the user wishes to examine or merely presses the MM button 178 to continue. Now, the navigational instrument is in the input mode with the memory storage location reference number in the display. At this point, the user simply enters the data as requested or presses the MM button 178 to skip to the next entry. At the conclusion of this operation, the user will be back at the beginning with the option of selecting a memory location to scroll through or the option of entering more data. If the user wishes to exit, the user merely presses the BRK button 164.

If the user wishes to erase a storage location, the user can enter the location number and then on demand enter "00" for the first value. This operation erases the location in the memory and frees up the storage location. Once the data is entered, the navigational instrument will store the information in memory and provide the storage location number where the data will remain until the user requires it.

In the second row down, leftmost column of the keyboard 7 is the BKB/"4" button 180. When used as in a conventional calculator (mode 2), the key's use is self-explanatory. When the BKB button IB0 is used in mode 1, the button 180 allows the user to observe the current backbearing or to calculate a backbearing as desired. Additionally, the button 180 may be used in conjunction with stored data when using an "on course system". It should be noted that when the backbearing function is engaged by the BKB button 180, the data is displayed on the top line 150 of the display 5, and the normal display is disabled in order to allow the user to display stored waypoint data on the lower line 152 of the display 5, and compare the stored backbearing data with the true backbearing data.

More specifically, backbearing is the reverse of forward bearing. In other words, a user may wish to use the backbearing course data in order to return to his original route.

The backbearing function can be effected in, for example, the following two ways:

1. the user may "freeze" the active display by pressing the BRK button 180 as the backbearing data is being displayed. In this manner, the backbearing data is continuously displayed on the upper line 150 of the display 5; and 2. the user may effectuate the backbearing function by pressing the BKB button 180. In this manner, the backbearing data is continuously displayed on the lower line 152 of the display 5.

In both of the above operations, the user may compare other information with the backbearing data. For example, the comparison of backbearing data with field memory waypoint data. To do this, the user presses the BKB button 180 in order to lock the upper line 150 of the display 5 to the backbearing function; then, the user presses the FM button 198. Consequently, the last waypoint data taken is displayed on the lower line 152 of the display 5. The user then uses the down and up arrow buttons 176, 196 in order to select a specific memory location. The user then uses the left and right arrow buttons 184, 188 in order to scroll to the left and right, respectively, so as to review the additional waypoint data that is hidden from view on the display 5. If desired, the user may scroll the data so as to set the waypoint backbearing value (in the lower line 152 of the display 5) immediately beneath the active backbearing value (in the upper line 150 of the display 5) so as to engage the "On Course" system. In order to exit from the backbearing function, the user simply presses the BRK button 164 which allows the navigational instrument to exit the Field Memory and Backbearing functions, and to restore the display 5 to normal scrolling.

In the second row down, second column from the left of the display 5 is the ALT/"5" button 182. When used as in a conventional calculator (mode 2), the button's use is self-explanatory. When the button 182 is used in mode 1, the button 182 allows the user to review all pressure altitude related functions, such as, density altitude, pressure altitude, rate of change of barometric pressure, and local barometric pressure. Additionally, this button 182 allows the user to correct for local pressure changes.

The altimeter function invoked by the ALT button 182 provides the user with the following information:

1. altitude corrected for local barometric pressure (true altitude) which is based on the ability to update this function to reflect changes based on local conditions;

2. raw or current barometric pressure;

3. barometric pressure corrected for temperature (density altitude);

4. rate of change of basic barometric pressure as an indicator of impending weather conditions. It is noted that this function can be preset to cause an alarm should the rate of change exceed a given (user-defined) value in order to alert impending weather changes; and 5. ability to determine local barometric pressure through the comparison of measured altitude to known altitude data (i.e., topographical maps or landmarks).

The altimeter function may be effectuated by the ALT button 182 in the following two ways:

1. the user may "freeze" the active or current data on the display 5 with the BRK button 164 as the altitude data is being displayed on the display 5. This operation will display the altitude function (i.e., altitude data previously selected during the initialization operation of the navigational instrument) on the upper line 150 of the display 5; and 2. the user presses the ALT button 164 which will display the altitude data on the lower line 152 of the display 5. With the altitude function in effect, the user can determine vertical travel, and distance (through triangulation; see, discussion of TRI button 170); navigate from contours alone; and may predict the weather.

In the second row down, third column from the left is the "<"/"6" button 184. When used as in a conventional calculator (mode 2), the button's use is self-explanatory. When used in mode 1, the button 184 allows the user to move or scroll through the data (e.g.,map memory data, waypoint data or the like) being displayed on the display 5 to the left during the operation of various functions.

In the second row down, fourth column from the right of the keyboard 7 is the IFR/"x" button 186. When used as in a conventional calculator (mode 2), the button 186 effectuates a multiplication operation and its use is self-explanatory. When used in mode the button 186 allows the user to enable the infrared sensor 30 and to observe the resultant reading as a bar graph on the display 5 or an audible signal as desired.

The infrared sensor function which are effectuated by the button 186 allows the user to measure "hot bodies" within the surrounding area. In other words, the infrared sensor 30 may detect hidden animals, lost or injured people or a cabin in a snow storm. The data is provided to the user in a visible form through a bar graph on the display 5 and/or through an audible signal which increases or decreases in pitch as the signal strength varies in intensity (i.e., as the detected "hot body" draws closer to the navigational instrument). The infra red function may be invoked by the button 186 in the following two ways:

1. the user may "freeze" the active display on the display 5 with the BRK button 164 as the infrared function is being employed resulting in the infrared data to be displayed on the upper line 150 of the display 5; and 2. the user presses the IFR button 186 which then displays the infrared data on the lower line 152 of the display 5.

As previously discussed, the infrared sensor 30 (see, e.g., FIG. 5) is preferably located behind the circular opening or aperture 24 of the fold down protractor and graduated scale 3. In order to use the navigational instrument in the function effectuating the infrared sensor 30, the user simply points or sights the infrared sensor 30 in the direction to be screened, and the user slowly scans the area with the infrared sensor from side to side or up and down while watching the bar graph on the display 5 or by listening to the audible signal preferably operably incorporated within the navigational instrument. It is noted that the infrared function is a relative measure of sensed radiation. In order to exit the infrared function, the user simply presses the BRK button 164.

In the second row down, fifth column from the right of the keyboard 7 is the ">" (right scroll)/"MC" button 188. When used as in a conventional calculator (mode 2), the button 188 is used to clear the calculator's temporary memory. When used in mode 1, the right scroll button 188 allows the user to move to the right through the data (e.g., map memory data, waypoint data or the like) being displayed on the display 5 during the operation of various functions.

In the first row, leftmost column in the keyboard 7 is the CNV/"7" button 190. When used as in a conventional calculator (mode 2), the button's function is self-explanatory. When used in mode 1, the CNV button 190 allows the user to effectuate conversion functions for map scales, and units of measurement.

With the use of the CNV button 190, the user can convert various commonly used measurement values (e.g., miles to kilometers, feet to inches, pounds to kilograms, temperatures in Fahrenheit to temperature in Celsius, degrees to grads or the like) or set the navigational instrument to the appropriate map scale (e.g., 1 to 150000, to 250000 or the like) by invoking the conversion function with the use of the CNV button 190.

Here, the user presses the CNV button 190 to enable the conversion function, and then uses the "down arrow" and "up arrow" buttons 178, 196 to move through the various selections of conversion functions. When the desired conversion function has been selected, the user simply depresses the CNV button 190 another time. At this point, the navigational instrument will be ready for the user to enter the value to be converted. When the value is entered, the user simply presses the CNV button 190, and the answer or converted data is displayed on the display 5. In order to exit from the conversion function, the user merely presses the BRK button 164.

In the first row, second column from the left of the keyboard 7 is the HLP/"8" button 192. When used as in a conventional calculator (mode 2), the button's function is self-explanatory. When used in mode 1, the button 192 allows the user to invoke a help function. By depressing the scroll or arrow buttons 176, 184, 188, 196, the user can observe a variety of key terms designating specific tutorial information. On the user's selection of a key term, the user can then review the tutorial information on the display 5 corresponding to the selected key term.

The help function allows the user immediate access to online assistance in the use of the navigational instrument. In other words, the help function may be thought of as a mini user's manual. To invoke the help function, the user simply presses the HLP button 192, and allows the user to scroll through the key words on the display 5 with the down and up arrow buttons 176, 196. When the user has identified the area or information of interest, the user then presses the HLP button 192 again, and the user will then enter and will be able to observe a more detailed script or information o the particular function which the user has selected. In order to exit from the HLP function, the user simply presses the BRK button 164.

In the first row, third column from the left of the keyboard is the LVL/"9" (numeric digit) button 194. When used as a calculator (mode 2), the button's function is self-explanatory. When used in mode 1, the button 194 allows the user to sight the navigational instrument, and read inclination or leveling information (i.e., the angle in the vertical plane) on the lower line 152 of the display 5. Here, the term "inclination" refers to the angle in the vertical plane (pitch up or pitch down), and the angle in the horizontal plane (left side low or right side low).

The leveling/inclination function allows the user to accomplish two separate tasks. At least one of these tasks is to aid the user in holding the navigational instrument at a level position while taking a bearing. In order to accomplish this task, the user views the arrows on the display 5 which should indicate to the user the specific position of the instrument to be moved for correcting the desired leveling of the navigational instrument. The arrows preferably appear with the bearing function data on the display 5. An example of the results derived from this specific function is reading derived from a carpenter's level. Here, in order to assure that a target object is truly level, a carpenter, for example, must take at least two measurements; i.e., once at any position and once more at a position which is at a right angle to the original detected position. For instance, one may think of this measurement function as when in an airplane where one measurement is the nose up/down or pitch measurement, while the other measurement is the roll or wing low measurement. A second function of the leveling/inclination function can be effectuated when the user desires to determine an angle relative to the horizontal plane. In this instance, the leveling arrows on the display 5 are ignored and the navigational instrument is positioned for sighting a potential target; then, the angles or degrees out-of-level from the horizontal plane is then read from the display 5, preferably without regard to the arrows displayed thereon. In order to effectuate the above-described operation of measurement, the navigational instrument is equipped with at least two leveling sensors at right angles to each other, and may be selected in the following ways:

1. by "freezing" the leveling function with the BRK button 164 if the leveling data is shown on the active display on the display 5. In this manner, the leveling data is continuously displayed on the upper line 150 on the display 5; and 2. by pressing the LVL button 194, the data effectuated by the leveling function is displayed on the lower line 152 on the display 5. Thus, the user is able to simultaneously view the level data in the lower line 152 on the display 5 along with other data on the upper line 150 on the display 5.

In the first row, fourth column from the left of the keyboard 7 is the " "/"+" button 196. When used as in a conventional calculator (mode 2), the button's function performs the addition operation and its use is self-explanatory. When used in mode 1, the button 196 allows the user to scroll "up" through various data (e.g., map memory data, waypoint data or the like) on the display 5.

In the first row, fifth column from the left of the keyboard 7 is the FM/"MS" button 198. When used as in a conventional calculator (mode 2), the button 198 allows the user to store calculator information in calculator memory, and its use is self-explanatory. When used in mode 1, the button 198 allows the user to review and edit existing real field data stored in memory as a waypoint (i.e., a point in time where all available data was recorded) or to record a new waypoint.

The field memory function effectuated by the button 198 is achieved by pressing the FM button 198 once in order to enter field memory function for data review, and to again trap or store current waypoint information. In order to edit field memory data, the user employs the arrow buttons 178, 186, 194, 198 in order to scroll through the field memory data. In order to exit from the field memory function, the user can simply press the BRK 164 button.

As one travels towards a desired destination, one may wish to retain information at a specific point in the journey. This specific information is known as a "waypoint". As discussed above, with the use of the field memory function, the user simply presses the FM button 198 in order to record a waypoint. Subsequently, the display 5 leaves the regular or current display mode, and enters the field memory capture mode in which case the last waypoint data taken is displayed. The user may then scroll through the stored waypoint data using by using the arrow buttons or may capture a new waypoint data by simply pressing the FM button 198 a second time. At this point, the navigational instrument then proceeds to automatically record the current bearing, calculate the backbearing and store all current information in memory (e.g., date, time, bearing, backbearing, temperature and barometrics). The navigational instrument will then query for distance as an additional item. If the user does not wish to provide the requested distance information at this time, the user may simply press the FM button 198 again at which time display 5 will output bearing and backbearing information along with the number of the memory storage location on the lower line 152 of the display 5.

If the user does not require the "on course" system at this time, the user may simply exit the field memory function by pressing the BRK button 164. If desired, the user can recall the field memory data at a later date by memory location number or by scrolling through the memory locations by utilizing the arrow buttons. This specific operation may be performed at the initial invocation of the field memory function. If the user desires to erase a field memory storage location, the user may do so by pressing the FM button 198, and selecting the memory storage location number and then entering "00". This specific operation will erase and release the selected storage location for future use. In order to exit from the field memory function, the user simply presses the "BRK" button 164 at any time.

As one travels towards a desired destination, one may lose sight of a specific landmark or be forced to detour. The traveler may then wish to retain the bearing of the primary landmark, and also have access to the detour bearing as well. In order to assist the user, the "on course" system is provided. The "on course" system may be effectuated by pressing the FM button 198, which then instructs the navigational instrument to leave the display mode and enter the field memory display mode. The navigational instrument then displays the last waypoint data o the lower line 152 of the display 5. The FM button 198 is then pressed a second time which then freezes the current bearing, calculate the backbearing, store all current information in memory (e.g., date, time, bearing, backbearing, temperature, barometrics) as a waypoint and queries the user, as discussed above, for distance as an additional item. If the user does not wish to enter a distance value at this time, the user simply presses the FM button 198 again. The display 5 then displays bearing and backbearing along with the number of the memory storage location on the lower line 152 of the display 5 which accomplishes one half of the data required for the "on course" system.

The second half of the data required for the "on course" system is the active bearing as provided in the upper line 150 of the display 5. As the traveler detours from the original course, the user continuously compares the deviation from the frozen heading. When the two displayed bearings are equal, the traveler is once again "on course".

A "bearing" is one degree in a 360 degree circle called an azimuth scale. Each degree, or bearing may be the direction the user may need to travel. In order to use the navigational instrument to measure the bearing, the user simply holds the navigational instrument level, points it in the direction user wishes to travel and read the bearing from the display. If the user wishes to "freeze" the display so as to be able to sight a particular point and then lock the display on that bearing, the user can do so with the DLB or the display lock button. It is noted that the accuracy of the bearing readout is influenced by how level the navigational instrument is held at the moment of sighting. In order to deal with the leveling of the navigational instrument, level indicator arrows are provided to the right of the active bearing data on the top line 150 of the display 5. The position of the navigational instrument relative to the horizontal is indicated by an up/down arrow (pitch) and a left/right arrow (roll) which indicates the offset from the horizontal. When the navigational instrument is truly level, the arrows in the display 5 will be replaced by stars/asterisks in each of the respective positions. In order to invoke the bearing function, the user performs the following steps:

1. the display 5 is on normal display mode;
2. as the display 5 shows the bearing, the user presses the BRK button 164 in order to lock the navigational instrument in this function;
3. sight on the point the user desires, and momentarily press the DLB button on the left side of the navigational instrument;
4. to release the display 5, the user simply presses the DLB button another time. The user then takes multiple readings in this manner by simply repeating steps 3 and 4, above; and
5. to return to normal display operation, press the BRK button 164.

Weight, low power consumption, physical dimensions and manufacturing simplicity are intended for the navigational instrument of the present invention. Consistent with this intention is the minimizing of the final chip count and, thus, the space required through the use of multi-function devices, and substantially performing the above-described functions and processes with the use of the above-described steps within the CPU 88 by way of software or the like, along with the hardware whenever possible. In order to reduce the chip count by at least two integrated circuits and to eliminate the need for multiple operating voltages in the navigational instrument of the present invention, the interface is optically coupled in such a way as to supply the required interface voltages from the external instrument, and the voltage to optical translation at the interface is performed by discrete photo devices, rather than integrated circuits.

Moreover, in order to perform the analog-to-digital conversion function with the minimum space requirement and chip count, a serial analog-to-digital conversion method is selected over the common off-the-shelf bus-based solutions. In order to reduce another area of component count, a micro controller is preferable over a standard microprocessor. This allows for multiple functions to be housed in one integrated circuit. The microcontroller contains the CPU, at least two 16-bit counter timers, bank selectable RAM, the RS232 interface, the master oscillator and the program memory. Through the use of one of the counter timers, the real time clock is implemented in the software operating the CPU rather than through a hardware. The program memory is used rather than another discrete device through the use of the internal ROM. The analog-to-digital conversion is performed as a function of the internal timing measurement by way of the serial analog-to-digital converter with the use of a second counter timer and supporting software, rather than through the use of an additional external device (e.g., a standard analog-to-digital converter integrated circuit). Commonly used data storage functions, such as, the clock memory, occur on a single integrated circuit by way of the on-board bank selectable RAM 90. It is preferred that CMOS circuitry be used extensively, wherever possible, for maintaining the power consumption at an absolute minimum for long term battery operation in order to make the navigational instrument portable for long travel. Alternatively, replacement of batteries on an individual basis can be made in order to obtain minimum data loss while in the field. Moreover, since the RAM data/program storage mechanism is provided by way of low power CMOS technology, only one of the pluralities of batteries is actually required for proper data/program storage in RAM 90.

While the invention has been particularly shown and described in reference to preferred embodiments thereof, it will be understood by those skilled in the art that changes in form and details may be made therein without departing from the spirit and scope of the invention.

We claim:

1. A multi-purpose navigational apparatus, comprising:
   a temperature sensor means for sensing the temperature of the surrounding area of said navigational apparatus;
   a barometric sensor means for sensing the barometric pressure of the surrounding area of said navigational apparatus;
   an infrared sensor means for sensing, in the surrounding area of said navigational apparatus, bodies exhibiting heat;
   a magnetometer means for determining navigational information;
   a microprocessor means for receiving, processing, and outputting information directly from said temperature sensor means, barometric sensor means, infrared sensor means and magnetometer means, and for storing said information;
   keyboard means operably coupled to said microprocessor means for communicating by a user with said microprocessor means;
   display means operably coupled to said microprocessor means for displaying at least one of information processed through said microprocessor means, said information being at least one of said information for determining at least a location of a user of said apparatus, said information being information from at least one of said temperature sensor means, barometric sensor means, and infrared sensor means for determining at least an environmental condition surrounding said user;
   a power source means for providing power to said navigational apparatus; and
   upper and lower casings for housing said temperature sensor means, barometric sensor means, infrared sensor means, magnetometer means, microprocessor means, keyboard means, display means, and power source means.

2. The navigational apparatus as in claim 1, further comprising a freeze switch means for halting or freezing displayed information in said display means.

3. The navigational apparatus as in claim 1, further comprising a pop-up lens which extends above said upper casing in line with said display means for allowing said user to sight an object and simultaneously read bearing information from said display means.

4. The navigational apparatus as in claim 1, further comprising a foldable protractor and graduated scale for providing data to be inputted into said microprocessor means.

5. The navigational apparatus as in claim 1, further comprising an input/output port means for allowing at least one of an external electronic instrument and external computer to communicate or interface with said microprocessor means.

6. The navigational apparatus as in claim 1, wherein said temperature sensor, barometric sensor, and magnetometer means are solid state types.

7. The navigational apparatus as in claim 1, where said magnetometer means is a flux gate magnetometer in a circuit board having an X and Y output being on an orthogonal relationship with each other.

8. The navigational apparatus as in claim 1, wherein said microprocessor means comprises a read only memory portion for housing microprocessor software, a random access memory for storing data and programs, and a central processing unit, wherein said central processing unit comprises counter timers, serial interface, and at least one master oscillator, wherein said central processing unit processes at least said information directly received from said magnetometer means, wherein said central processing unit further processes said information from at least one of said temperature sensor means, barometric sensor means, and infrared sensor means.

9. The navigational apparatus as in claim 8, further comprising an analog multiplexer, wherein said multiplexer receives said information from said temperature sensor means, barometric sensor means, and infrared sensor means, and said navigational information from said magnetometer means, and directs said information into said central processing unit.

10. The navigational apparatus as in claim 1, further comprising a serial analog-to-digital converter operably connected to an analog multiplexer and said central processing unit.

11. A method for operating a multi-purpose navigational instrument comprising the steps of:
turning power on of said navigational instrument;
initializing of a central processing unit of said instrument;
self-testing of memory, battery voltage and real time clock of said instrument;
establishing of initial values in said central processing unit of a temperature sensor and a barometric pressure sensor of said instrument, and loading of said initial values into separate buffers of a memory of said central processing unit;
displaying desired initial values onto a display of said instrument;
determining navigational information from an internal magnetometer;
providing said navigational information to said central processing unit directly from said magnetometer;
at least one of processing and storing said information in said central processing unit;
communicating to said central processing unit of said instrument by a user by way of a keyboard of said instrument;
operating said central processing unit by way of said keyboard to perform desired tasks; and thereafter
displaying desired information onto said display of said instrument, said information being at least one of said information for determining at least a location of a user of said instrument, said information being information from at least one of said temperature sensor, barometric sensor, and infrared sensor for determining at least an environmental condition surrounding said user.

12. The method for operating a multi-purpose navigational instrument as in claim 11, further comprising the step of halting or freezing the desired information on said display of said instrument for allowing a user to readily and conveniently read said information, and to thereafter utilize said information.

13. The method for operating a multi-purpose navigational instrument as in claim 11, further comprising the step of indicating by said instrument when a power source of said instrument is diminishing.

14. The method for operating a multi-purpose navigational instrument as in claim 11, wherein said step of operating said central processing unit comprises the step of updating temperature read from said temperature sensor.

15. The method for operating a multi-purpose navigational instrument as in claim 11, wherein said step of operating said central processing unit comprises the step of updating barometric pressure read from said barometric pressure sensor.

16. The method for operating a multi-purpose navigational instrument as in claim 11, further comprising the step of providing magnetic bearing from said internal magnetometer of said instrument.

17. The method for operating a multi-purpose navigational instrument as in claim 16, further comprising the step of updating said magnetic bearing.

18. The method for operating a multi-purpose navigational instrument as in claim 17, further comprising the step of providing a pop-up lens through which an in-lined target sight is aimed in line with said display having bearing information thereon.

19. The multi-purpose navigational apparatus as in claim 1, wherein said display means is foldable in at least one of an upward position and a downward position relative to said upper casing.

20. The method for operating a multi-purpose navigational instrument as in claim 11, wherein at least one of said steps of displaying desired initial values and of displaying desired information comprises the step of adjusting the contrast of the at least one of the displayed initial values and desired information in response to temperature changes.

21. The method for operating a multi-purpose navigational instrument as in claim 20, wherein said step of adjusting the contrast is user-definable.

22. The method for operating a multi-purpose navigational instrument as in claim 11, wherein said step of operating said central processing unit comprises the step of switching to at least one of a calculator mode of operation and another mode for engaging said step of communicating to said central processing unit.

23. The method for operating a multi-purpose navigational instrument as in claim 11, wherein said step of operating said central processing unit comprises the step of performing time operations.

24. The method for operating a multi-purpose navigational instrument as in claim 11, wherein said step of operating said central processing unit comprises the step of breaking away from and resuming said step of communicating to said central processing unit when desired by a user.

25. The method for operating a multi-purpose navigational instrument as in claim 11, wherein said step of operating said central processing unit comprises the step of selecting numerous special functions in conjunction with said step of communicating to said central processing unit.

26. The method for operating a multi-purpose navigational instrument as in claim 11, wherein said step of operating said central processing unit comprises the step of providing specific equations onto said display in conjunction with said step of communicating to said central processing unit.

27. The method for operating a multi-purpose navigational instrument as in claim 11, wherein said step of operating said central processing unit comprises the step of operating on a map offsetting function.

28. The method for operating a multi-purpose navigational instrument as in claim 11, wherein said step of operating said central processing unit comprises the step of observation and modification of declination values in said central processing unit.

29. The method for operating a multi-purpose navigational instrument as in claim 11, wherein said step of operating said central processing unit comprises the step of scrolling through said values and information on said instrument in conjunction with said steps of displaying.

30. The method for operating a multi-purpose navigational instrument as in claim 11, wherein said step of operating said central processing unit comprises the step of inputting and reviewing memory locations for storing map information at least for use in a pre-journey plan.

31. The method for operating a multi-purpose navigational instrument as in claim 11, wherein said step of operating said central processing unit comprises the steps of reviewing and manipulating current and updated backbearing information.

32. The method for operating a multi-purpose navigational instrument as in claim 11, wherein said step of operating said central processing unit comprises the steps of reviewing and manipulating pressure related information.

33. The method for operating a multi-purpose navigational instrument as in claim 11, wherein said step of operating said central processing unit comprises the step detecting "hot bodies" within the surrounding area.

34. The method for operating a multi-purpose navigational instrument as in claim 11, wherein said step of operating said central processing unit comprises the step of converting at least one of map scales and units of measurements.

35. The method for operating a multi-purpose navigational instrument as in claim 11, wherein said step of operating said central processing unit comprises the step of providing tutorial information for use in at least said step of communicating to said central processing unit.

36. The method for operating a multi-purpose navigational instrument as in claim 11, wherein said step of operating said central processing unit comprises the step performing leveling operations.

37. The method for operating a multi-purpose navigational instrument as in claim 11, wherein said step of operating said central processing unit comprises the step of reviewing and manipulating current and updated field memory data.

* * * * *